United States Patent [19]

Renelt et al.

[11] 4,223,356
[45] Sep. 16, 1980

[54] METHOD AND ARRANGEMENT FOR FACSIMILE PICTURE TRANSMISSION

[75] Inventors: Gerhard Renelt, Hamburg; Ulf Rothgordt, Norderstedt, both of Fed. Rep. of Germany

[73] Assignee: U.S. Philips Corporation, New York, N.Y.

[21] Appl. No.: 884,127

[22] Filed: Mar. 7, 1978

[30] Foreign Application Priority Data

Mar. 16, 1977 [DE] Fed. Rep. of Germany ....... 2711377

[51] Int. Cl.² .......................... H04N 1/00; H03K 5/18
[52] U.S. Cl. ..................................... 358/261; 358/264; 371/31
[58] Field of Search ............... 358/264, 256, 260, 261; 340/257, 146.1 D, 725, 726

[56] References Cited

U.S. PATENT DOCUMENTS

| | | | |
|---|---|---|---|
| 3,895,186 | 7/1978 | Yoshida et al. | 358/264 |
| 3,974,326 | 8/1976 | Rosdolsky et al. | 358/261 |

*Primary Examiner*—John C. Martin
*Assistant Examiner*—Edward L. Coles
*Attorney, Agent, or Firm*—Thomas A. Briody; William J. Streeter; Edward W. Goodman

[57] ABSTRACT

In facsimile transmission by means of a redundancy reducing coding, for example run-length coding, a distance affects the entire remaining portion of the picture line. End-of-line control characters are therefore transmitted for line synchronization. As these characters are possibly also disturbed and the picture lines to be printed would then completely be lost, a fixed number of different end-of-line control characters are used in cyclic sequence from line to line. This enables the recognition of various successive disturbed picture lines, lost end-of-line control characters as well as end-of-line control characters artificially produced by a disturbance, so that the correct number of picture lines is always printed. Corrected picture lines are printed instead of the picture lines which were received in a disturbed manner, for example by taking over the contents of adjacent picture lines.

10 Claims, 5 Drawing Figures

METHOD AND ARRANGEMENT FOR FACSIMILE PICTURE TRANSMISSION

BACKGROUND OF THE INVENTION

The invention relates to a method and arrangement of facsimile picture transmission wherein digital signals, produced in a transmitter during the line-by-line scanning of pictures, are transmitted in coded form for redundancy-reduction to a receiver where they are decoded and printed by means of a printer. At the end of the signals associated with a scanned picture line an end-of-line control character is formed in the transmitter and transmitted to the receiver where the plurality of picture elements received after each end-of-line control character are counted and compared on the receipt of the next end-of-line control character with a predetermined number. In the event wherein the number of characters counted does not agree with the predetermined number, corrected signals for this picture line are printed instead of the incorrectly received signals of the picture line.

Such a procedure is disclosed in German Offenlegungsschrift No. 2,347,835. A frequently used form of coding is the so-called run-length coding, in which successive elements having the same luminance are counted and code words, corresponding to the number of elements, are transmitted. The code words generally have different lengths and are transmitted in immediate succession, that is to say without the insertion of separation marks. A disturbance during the transmission, even if it changes only one or a few bits of a code word of a picture line, disturbs the synchronization on separation of these code words in the receiver such that the entire remaining part of the picture line may be disturbed.

To obtain a minimum degree of synchronization, an end-of-line control character is transmitted at the end of each line, so that the picture line received thereafter can again be decoded correctly in the receiver. To prevent the disturbedly received picture line from being cancelled entirely during printing, which would result in a considerable shift of the printed picture in the case of frequently occurring disturbances and serious distortions in the transmission of pictures such as maps, the last correctly received picture line is printed instead of the disturbed line. However, it is also possible that a disturbance in the transmission disturbs an end-of-line control character itself so that it is no longer recognized as being correct in the receiver, or the disturbance of a code word with picture content may produce an end-of-line control character erroneously. With the prior art method, lines which should be printed would not be supplied at all or, erroneously, more than once in these cases.

SUMMARY OF THE INVENTION

It is an object of the invention to provide a method in which, in the case of disturbances of the end-of-line control characters themselves, a number of lines equal to the number of lines scanned in the transmitter would be printed in the receiver. In accordance with the invention this object is achieved, in a transmitter, in which a cyclic sequence of different end-of-line control characters is formed line-by-line from a predetermined number of end-of-line control characters and transmitted to the receiver, wherein the sequence of the end-of-line control characters received is examined and that, furthermore, in the case of inequality of the number of picture elements, the signals for a number of picture lines are corrected and printed in accordance with the sequence of the different end-of-line control characters received.

Due to the use of various different end-of-line control characters in a fixed sequence it can unambiguously be detected in the receiver if and how many picture lines were disturbed or whether an incorrect end-of-line control character was produced, as long as the number of disturbed picture lines which occur consecutively does not exceed the total number of different end-of-line control characters. The number of different end-of-line control characters can therefore be chosen in accordance with the quality of the transmitting channel, four different end-of-line control characters usually being sufficient for the majority of transmitting channels. Correcting the signals which were received with a disturbance can be done in the same manner as in the prior art transmission methods specified in the preamble, namely by replacing the disturbed signals by the signals of a non-disturbedly received picture line; other, known, correction methods are, however, also possible.

An embodiment of the method according to the invention is characterized in that when a number of end-of-line control characters are missing in the sequence between two correctly received end-of-line control characters, a number of lines corresponding to this missing number is printed, the signals for these lines being derived from the signals which were received correctly before or after the transmission disturbance causing the picture element inequality of a full picture line. In this manner it is guaranteed that at all times the correct number of lines is printed and that the lines printed instead of the disturbedly received picture lines can be corrected in a simple manner.

The correction of the signals of various successive picture lines which were received with a disturbance, is advantageously performed in such a form that, on receipt of a non-disturbed end-of-line control character, after the receipt of the signals of a full picture line with picture element inequality, a line is printed which is derived from the signals of the full picture line which was the last one received correctly, and that on receipt of the end-of-line control character after the next correct receipt of the signals of a full picture line, the signals for printing incorrectly received picture lines are derived from these signals of the picture line which was the last one received correctly. In this manner the scanned picture lines which were received in a disturbed manner are highly adapted at the printing, with a very little effort, to the original picture lines.

It is possible that, especially after the receipt of disturbed signals, an end-of-line control character is received which is converted by the disturbance in an end-of-line control character which is in itself correct, however of the wrong sequence. To ensure that also in this case the proper number of lines are printed, it is advantageous that on receipt of the end-of-line control character after the first correct receipt of the signals of a full picture line after the receipt of disturbed signals of picture lines, only one line with the signals derived from the correctly received signals is printed and that any further picture lines with the signals derived from the preceding correctly received signals of a full picture line are not printed, until the receipt of the next end-of-line control character after the correct receipt of the signals of the next full picture line. The definite correction of the number of lines to be printed is done with the end-of-line control character after the undisturbed receipt of two successive picture lines, so that it is reliably prevented that, owing to a previously disturbed end-of-line control character, too many lines are printed erroneously, as they cannot be erased afterwards.

The arrangement for performing the method according to the invention during transmission or receipt, is characterized in that the transmitter in the arrangement comprises a codeword generator for generating different end-of-line control characters, and a cyclic counter having a capacity equal to the total number of different end-of-line control characters, which counter receives a switch-through pulse at the end of the scanning of each picture line and controls the codeword generator such that each counter position is fixedly associated with the generation of a given end-of-line control character; and is characterized in that the receiver in the arrangement comprises a cyclic counter having a capacity equal to the cyclic counter in the transmitter, which counter receives a switch-through pulse on the printing of each picture line, the outputs of the counter being connected to a comparator which compares the position of the cyclic counter to a code word derived from the received end-of-line control character and whose output signal, indicating the result of the comparison, determines the printing of a picture line and the signals to be printed.

It is very simple to generate the different end-of-line control characters in a cyclic sequence due to the cyclic counter in the transmitter. By means of the cyclic counter in the receiver, it is then easy to investigate the correct sequence of the end-of-line control characters received and, if necessary, to control the printing of additional lines in the case of lost end-of-line control characters within the sequence, until the position of the cyclic counter, as a result of the switching action after each printed line, corresponds to the code word derived from the correctly received end-of-line control character.

A particularly simple form of the end-of-line control character is characterized in that the code word generator forms the end-of-line control character from a number of bit-signals predetermined for all end-of-line control characters and from the signals at the output of the cyclic counter. Each end-of-line control character then consists of the same number of bits namely from a number of bits, for example two bits in the case of four different end-of-line control characters, which directly represent the output signals of the cyclic counter in the transmitter and which can be compared, also directly, with the position of the cyclic counter in the receiver.

DESCRIPTION OF THE DRAWINGS

Embodiments according to the invention will be described in greater detail with reference to the drawing.

DESCRIPTION OF THE PREFERRED EMBODIMENT

Figure 1:
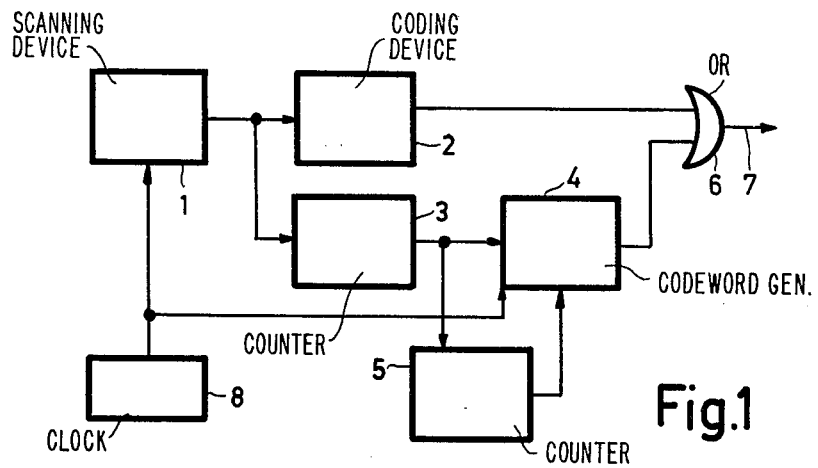
FIG. 1 shows a block diagram of the principal sections of the transmitter.

The greatly simplified block diagram of the transmitter in FIG. 1 comprises a scanning device 1 which scans line-by-line the picture to be transmitted, for example a page or a map printed with characters, and, converts the luminance values of the individual picture elements into a digital electrical signal and applies the signal to a coding device 2. The coding device 2 derives code words from the applied signal, for example by combining the picture elements having the same luminance values, which code words are transmitted serially, bit by bit, via an OR-gate 6 to a transmitting channel 7.

The picture element signals generated by the scanning device 1 are counted in a counter 3 which has a capacity equal to the number of picture elements stored in a scanned picture line, for example 1728 picture elements. When the counter 3 arrives at this position, it applies an output signal to a code word generator 4 and to a counter 5, whereupon counter 3 returns to its zero position. The signal of counter 3 can also be utilized for terminating the scanning of a line in the scanning device 1 and to switch over to the beginning of the next line.

Code word generator 4 starts generating an end-of-line control character with the output signal of the counter 3, which control character consists of a number of stored bit signals and of the signals at the output of the counter 5. The counter 5 is a modulo-4-counter consisting of binary reducing stages, which counter automatically cycles through the four positions thereof when counting pulses are applied. In addition, clock signals of a clock pulse generator 8, which also control the scanning device 1, are applied to the codeword generator 4, which then transmits the end-of-line control character serially, bit by bit, via the OR-gate 6 to the transmitting channel 7, during which time the coding device 2 supplies no signals due to the fact that the scanning device 1 moves to the next picture line. As a result, an end-of-line control character is transmitted between the code words of each scanned line, namely from line to line in cyclic sequence, a different end-of-line control character is transmitted in accordance with the instantaneous position of the counter 5. The code word generator 4 may, for example, be a shift register in which information can be entered in parallel, some parallel inputs being connected to the outputs of the counter 5 and the remaining inputs to fixed signal voltages, the output signal of the counter 3 entering this information in parallel into the shift register and the clock signals of the clock pulse generator 8 shifting this information in parallel and passing the output signal of the last stage of the shift register to the OR-gate 6.

Figure 2:
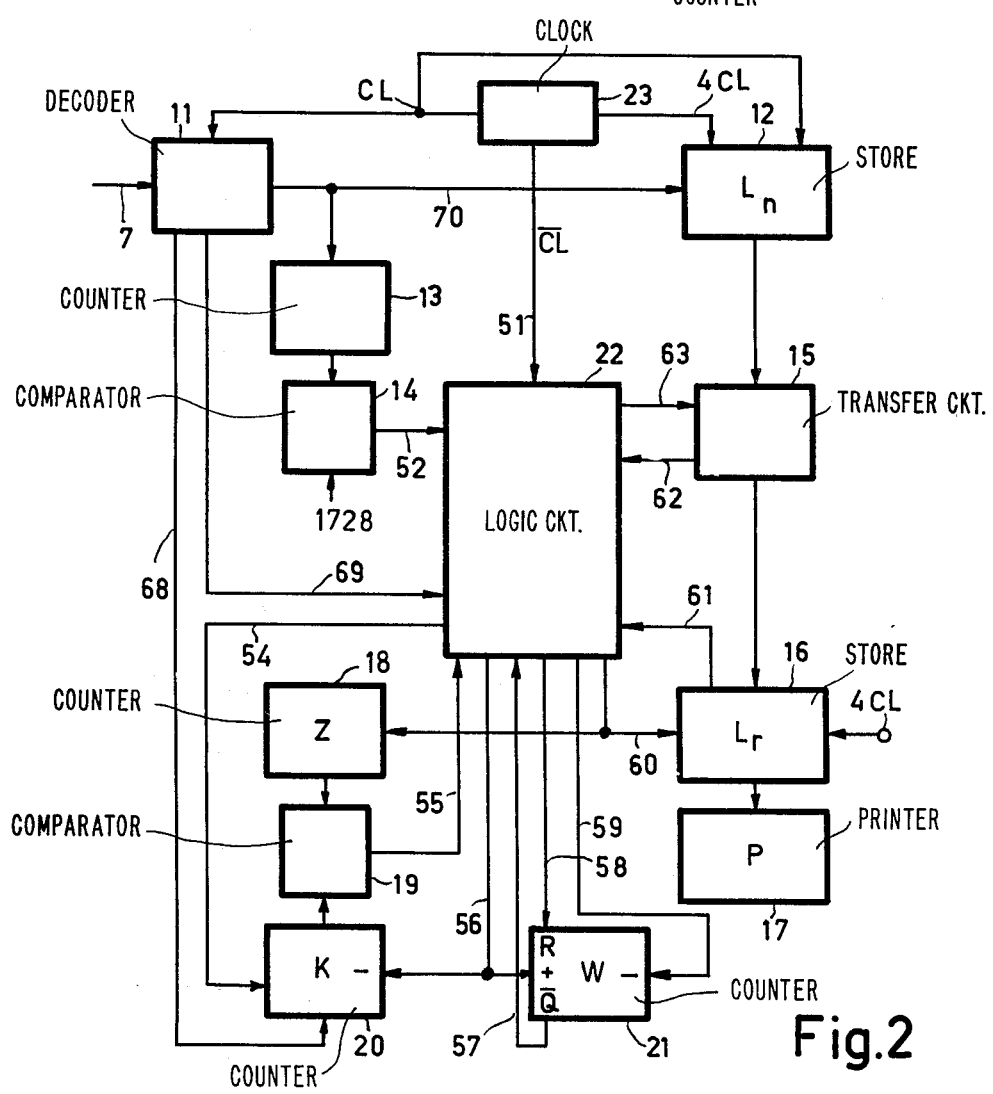
FIG. 2 shows a block diagram of the principal sections of the receiver.

With the receiver shown in FIG. 2, the signals arriving via the transmitting channel 7 are applied to a decoding device 11 which changes the code words, represented by the sequence of the signals, into a signal which directly represents picture elements and stores them via a lead 70 into a store (12, Ln). The number of picture elements is simultaneously counted in a counter 13. Furthermore, the decoding device 11 decodes the end-of-line control character and, the receipt of an end-of-line control character, supplies a signal (logic "1") on a lead 69 and the bit positions of the end-of-line control character on a lead 68, this position being formed at the transmitter side from the position of the cyclic counter 5 as a characteristic feature for the position of the received end-of-line control signal within the sequence.

The decoding device 11 is controlled by a clock pulse signal CL of a clock pulse generator 23 which supplies an inverse clock pulse signal $\overline{CL}$ to a logic circuit 22 via a lead 51. Furthermore, the clock pulse generator 23 supplies a clock pulse signal 4 CL at four times the frequency of clock signal CL. It is assumed that the signals on the leads 69 and 70 start, each time, at the beginning of a clock pulse and that the signals of the line 68 are already available beforehand.

The outputs of the counter 13, shown in FIG. 2 as a single output, lead to a comparator 14, the other inputs of which receive a signal combination corresponding to the number 1728, this number corresponding to the number of picture elements of each picture line at the transmitter side, that is to say corresponding to the capacity of the counter 3. If the position of the counter 13 corresponds to this number, the comparator 14 supplies a signal (logic "1") to the logic circuit 22 via a lead 52.

The output of store 12 leads to an additional store (16,$L_r$) via a transfer circuit 15. The capacity of the stores 12 and 16 must at least correspond to the number of picture elements per line. In addition it is a requirement that information can be entered into and read out from these stores simultaneously, possibly at different speeds. The transfer circuit 15 starts, on receipt of a starting signal from the logic circuit 22 via a lead 63, to transfer the contents of store 12 to store 16, under the control of the clock pulse signal 4CL, and supplies, at the end of the transfer, an end signal via a lead 62 to the logic circuit 22. If there is a starting signal on a lead 60, the store (16, $L_r$) supplies its contents to a printer (17, P), in which this contents is printed in the form of a written line. At the end of this contents transfer, store 16 supplies an end signal via a lead 61 to the logic circuit 22.

Instead of transferring the contents of store 12 to store 16, the transfer circuit 15 can alternatively interchange the inputs and outputs of the stores 12 and 16 so that alternately one of the two stores 12 and 16 stores the signal of a received picture line and the other store transfers its contents to the printer 17.

A cyclic line counter (18, Z) having a capacity equal to that of the counter 5 in the transmitter, receives a through-switching pulse at each starting signal on the lead 60, that is to say at each newly supplied picture line. The outputs, which are shown in FIG. 2 as a single output, of this line counter 18 are connected to a comparator 19 whose other input receives the signals from an end-of-line counter (20, K). In certain circumstances, in which logic circuit 22 supplies a signal via a lead 54, this end-of-line counter (20, K) takes over, in parallel, the signals present on lead 68 which, in practice, consists of different, separate lines. By means of clock signals on a line 56, the counter 20 can count down (−), which clock signals are derived from logic circuit 22. The capacity of the counter 20 must then be at least equal to the capacity of the line counter 18.

Furthermore there is a repetition counter (21, W) which must have at least the same capacity as the counters 20 and 18. This repetition counter 21 can be induced to count upwards (+) by means of clock signals on the lead 56 and to count down (−) by means of clock signals on a lead 59 and reset to the zero position (R) by means of a signal on a lead 58. If the repetition counter (21, W) is in the zero position ($W=0$), a signal having the logic "1" is produced at a lead $\overline{Q}$ and applied to the logic circuit 22 via a lead 57.

Figure 3:
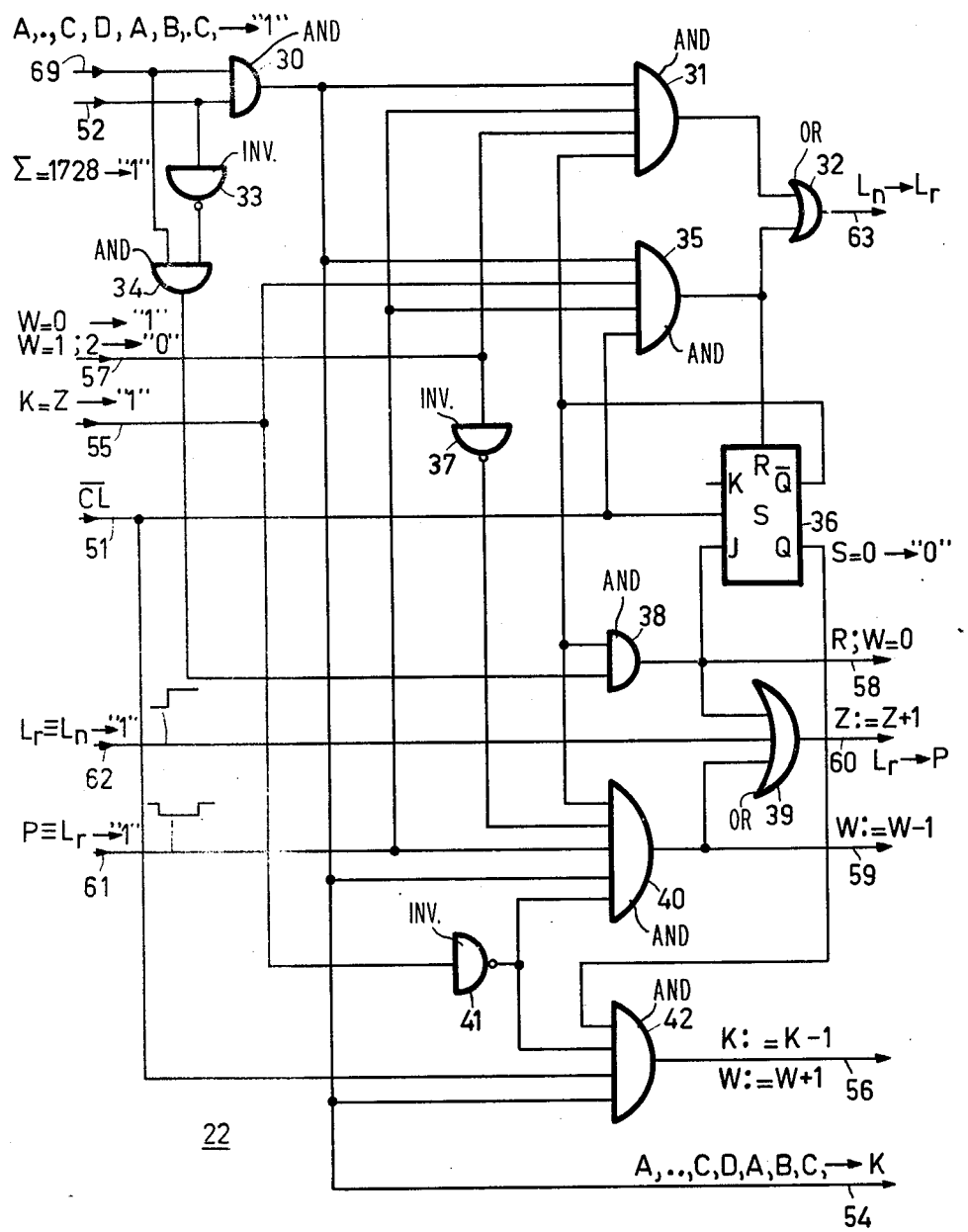
FIG. 3 shows in detail a part of the circuit shown in FIG. 2.

FIG. 3 shows the implementation of the logic circuit 22. The logic circuit 22 will be described by means of an example containing a transmission error. Such transmission errors may become apparent in a plurality of combinations of disturbed picture lines and disturbed end-of-line control characters which partly cause a different process in the receiver. However, to prevent the description from becoming too long, the example of a disturbance shown in FIG. 5 will be used as the starting point, a large proportion of the possible situations and processes occurring therein. To this end FIG. 5 shows a time diagram with a series of correctly and disturbedly received picture lines (provided with accents) and end-of-line control characters inserted between them as well as the associated states of individual components of the circuit shown in FIG. 2. On the other hand, the flow diagram in FIG. 4 shows in a convenient manner the sequence of conditions in certain circumstances and indicates at the same time how a microprocessor, used optionally instead of logic circuit 22, can be programmed.

FIG. 5 shows in the upper portion by means of 68, 69 the end-of-line control characters and at 70 the hitherto scanned, transmitted picture lines L (with information I) the end-of-line control characters being indicated by A to D inclusive, which follow one another cyclically, and the picture lines being numbered sequentially with L1, L2 ..... The spacings shown between the end-of-line control characters correspond schematically to the actual time interval.

The scanned picture line L1 is first correctly transmitted and the associated information I1 is received correctly, followed by a correct end-of-line control character A. When the end-of-line control character A arrives, information I1 of the picture line 1 is correctly present in store (12, $L_n$). With a correctly received picture line, at the end of the line, that is to say on receipt of the end-of-line control character, the counter 13 in FIG. 2 has just arrived in a position corresponding to 1728, so that the comparator 14 transfers a signal (+ =logic "1") to the logic circuit 22 via lead 52.

Figure 4:
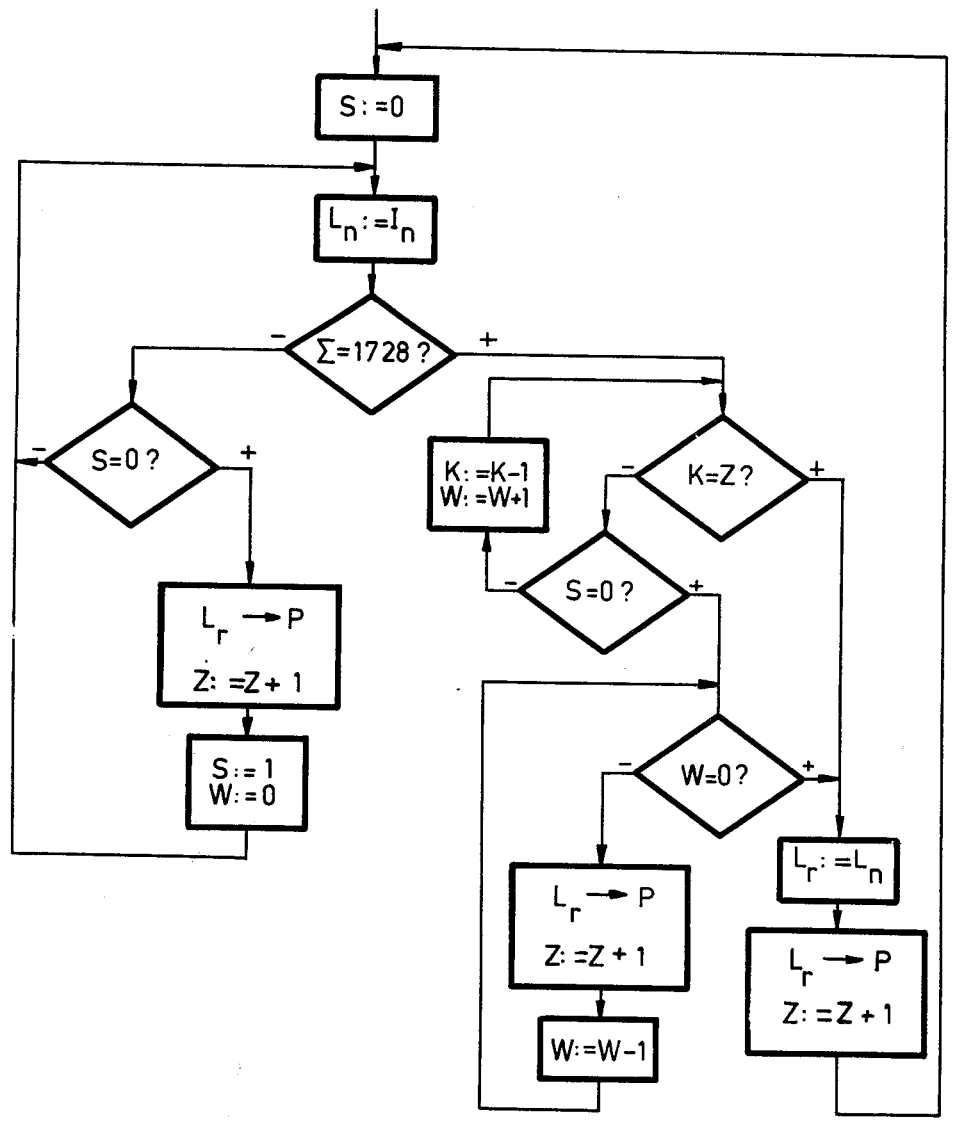
FIG. 4 shows a flow diagram for describing a series of signals in the case of errors.
Figure 5:
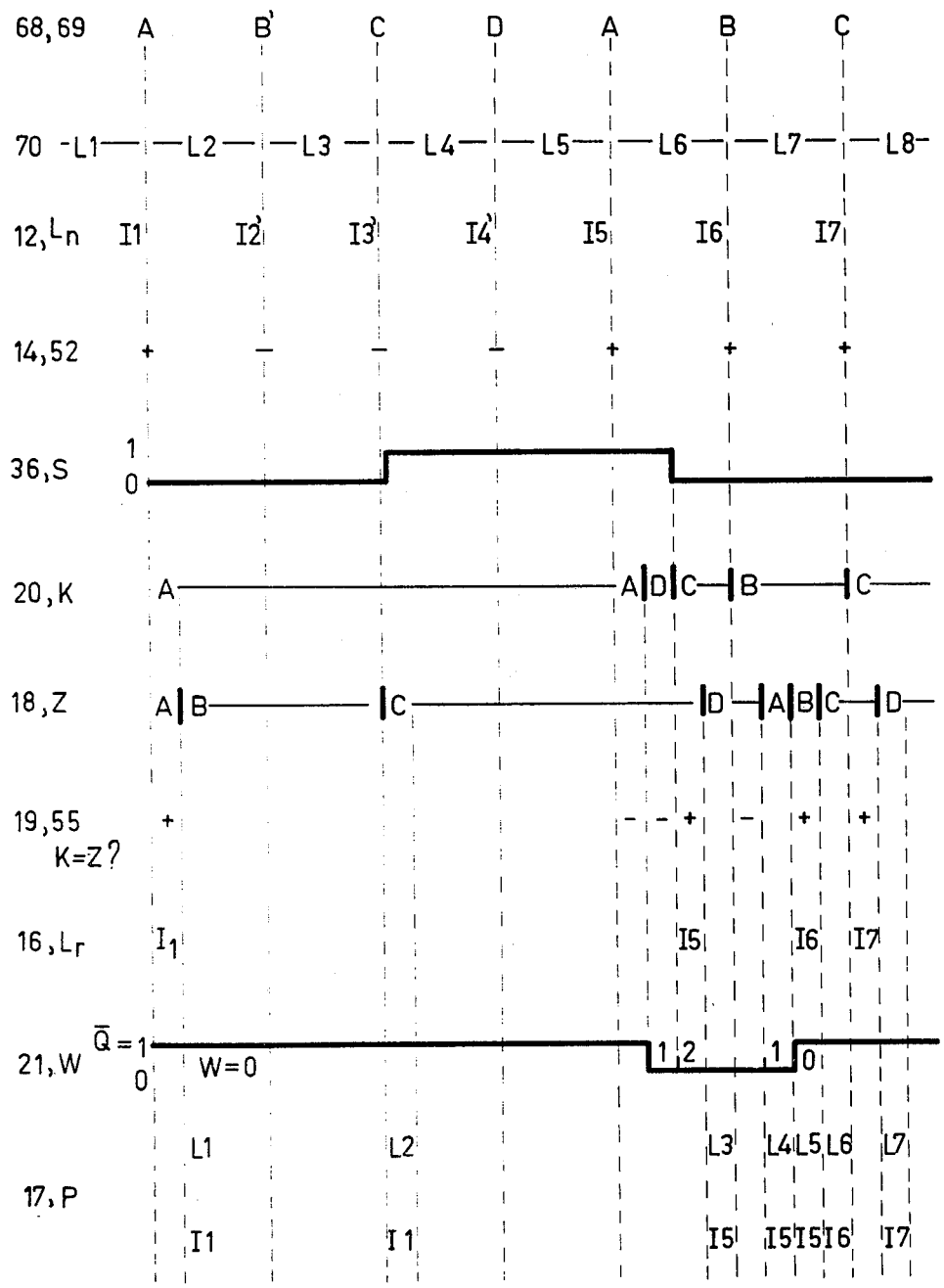
FIG. 5 is a time diagram illustrating a disturbance in the transmission and the states then occurring of individual sections of the circuit shown in FIG. 2.

As the flow diagram in FIG. 4 shows the number of the end-of-line control characters must be written ($K=Z$?) into the end-of-line counter (20, K) after a correctly received picture line, that is to say when the equation ($\Sigma = 1728? = +$) is positive. This is effected by the logic circuit 22 in FIG. 3, because the signal having the logic "1" or + of the comparator 14 on the lead 52 is combined in an AND-gate 30 with the subsequent end-of-line clock signal having the logic "1" on lead 69 and an output signal having the logic "1" is supplied via lead 54. The end-of-line counter (20, K) then receives the value A, as shown in FIG. 5.

At this moment the line counter (18, Z) will also be in the position A ($K=Z$) so that the comparator 19 supplies a signal having the logic "1" via lead 55. The positive equation shown in FIG. 5 (19, 55) by + must effect in accordance with the flow diagram in FIG. 4 (block $K=Z$?) the transfer of the contents of store (12, $L_n$) to store (16, $L_r$). This starting signal for the transfer ($L_n \rightarrow L_r$) is generated in FIG. 3 by an AND-gate 35 and applied to the transfer circuit 15 via an AND-gate 32 and lead 63. The AND-gate 35 receives the output signal of the AND-gate 30, which indicates the correct receipt of the last picture line, furthermore along with the signal ($K=Z \rightarrow$ "1") of comparator 19 via lead 55, as well as, via lead 51, an inverse clock signal $\overline{CL}$, which, consequently, appears half a clock period after the signal on lead 54, by means of which the end-of-line counter (20, K) was written into, to prevent the preceding contents of the end-of-line counter (20, K) from generating a signal erroneously. The AND-gate 35 receives a release signal via lead 61.

After transmission ($L_r := L_n$, FIG. 4) the information I1 of the transmitted picture line L1 must be printed. To this end the end-of-line signal ($L_r \equiv L_n \to$ "1") on lead 62, which signal is generated for example by a counter in the case of serial transmission, is transferred from the transfer circuit 15 in FIG. 3 to lead 60 via on OR-gate 39, which lead is connected to the starting input of the store (16, $L_r$), and the supply to the printer (17, P) starts ($L_r \to P$). So the scanned picture line L1=I1 is then printed as the first line, as shown in FIG. 5, the information I1 remaining in store 16. In addition, the starting signal on lead 60 switches the line counter (18, Z) to position B ($Z := Z+1$, bottom right in FIG. 4). This ends all the processes effected by the end-of-line control character A and the next scanned picture line L2 is transmitted and received. It is now assumed that in the transmission of the next scanned picture lines L2 and L3, transmission errors occur (disturbed data I2' and I3') and also that the end-of-line control character B transmitted between these two picture lines by the transmitter was disturbed (B'), so that it cannot be recognized any longer in the receiver. The subsequent end-of-line control character C is received correctly. On receipt of this end-of-line control character C the counter 13 is not in the prescribed position, because the number of signals received is less than or exceeds the number for a picture line. The possibility that the transmitted code words are so distorted by disturbances that exactly the correct number of signals for a picture line occurs during decoding is negligible small. It should be noted that, as will become apparent, the logic circuit 22 is only active after receipt of an undisturbed end-of-line control character, the information I being disturbed or not.

With the end-of-line control character C received correctly as a release or clock signal after a first transmission error (I2') the received picture line which was received as the last correct picture line must again be supplied by store (16, $L_r$) (L2=I1) in accordance with the flow diagram of FIG. 4, bottom left, without a transfer of the contents of store I2 to store 16 taking place. This printing of a picture line is started in FIG. 3 by and AND-gate 38 because no signal or the logic "0" is present on lead 52 leading from comparator 14 and consequently an inverter 33 prepares and AND-gate 34 and the end-of-line clock signal C on lead 69 generates at the output of AND-gate 34 a logic signal "1" which is applied to one input of the AND-gate 38, while an error indicator, in the form of a bistable multivibrator 36, is still in a position ($S = Q = 0$, $\overline{Q} = 1$) in which a logic "1" is also applied to the other input of the AND-gate 38. The output signal of the AND-gate 38 is transferred via the OR-gate 39 to lead 60 which causes the store (16, $L_r$) to transfer its content I1 from the first transmitted picture line L1 to the printer (17, P) ($L_r \to P$), where this contents I1 is printed as the second picture line L2. Simultaneously this signal on lead 60 switches the line counter (18, Z) to the position C ($Z := Z+1$) as shown in FIG. 3 and FIG. 5.

In addition, the output signal of the AND-gate 38 is applied via lead 58 to the reset input R of the repetition counter (21, W) but has, however, no effect there ($R:W=0$) because this counter is already in the reset position in accordance with the position $W=0$, $\overline{Q} = 1$. Furthermore the output signal of the AND-gate 38 is applied to the input J of the bistable multivibrator 36 constituted by a J-K flip-flop, and at the beginning of the next inverse clock signal $\overline{CL}$ on lead 51, after the start of the end-of-line clock signal C on lead 69, this output signal is written into the bistable multivibrator 36, so that now the output $\overline{Q}$ of the multivibrator 36 carries a logic "0" and the output Q a logic "1". This terminates the output signal of the AND-gate 38. This adjustment of the error indicator S and the resetting of the repetition counter W ($S:=1$, $W:=0$) are shown in FIG. 4, bottom left, after the transfer of the picture line ($L_r \to P$), but a simultaneous release in the implementation shown in FIG. 3 is simpler and equivalent as regards its operation. The conditions thus obtained are shown in FIG. 5. It appears that $S=0$ or $S=1$ indicates that the preceding line information I has been received correctly or in a disturbed manner. The blocks $S:=0$ and $L_n := I_n$ in FIG. 4 indicate that for $S=1$ no disturbed information I is applied from store $L_n$ for further processing (FIG. 5).

Now the scanned picture line L4 is transmitted which is also received disturbed in this example (I4'). However, because the preceding picture lines L2 and L3 were already received in a disturbed manner and the error indicator S is thereafter no longer in the position "0" ($S=Q(36)=1$) no processes must be started in accordance with the flow diagram in FIG. 4, upper left, but only the new picture line L4 is received and stored in store 12 without further processing.

For the logic circuit 22 shown in FIG. 4 this means that no output signal is generated. Owing to the fact that the signal on lead 52 of the comparator 14 is missing owing to the disturbed receipt (I4') and AND-gate 30 supplies no output signal although the end-of-line clock signal D was received undisturbed, so that the AND-gates 31, 35, 40 and 42 also cannot supply an output signal, whilst the AND-gate 38 supplies no output signal because the bistable multivibrator 36 was switched over ($\overline{Q}=0$) during the preceding disturbed receipt, as described previously.

Now the scanned picture line L5 is transmitted which is correctly received without disturbance (I5), followed by the correct receipt of end-of-line control character A. Because the counter 13 has attained the prescribed position on arrival of the end-of-line control character A and the comparator 14 supplies a signal via the lead 52, the output signal of the AND-gate 30 writes via lead 54 the corresponding feature of this end-of-line control character into counter (20, K) where it was, however, already present, as also appears from the flow diagram in FIG. 5. Now, however, there is no agreement ($K \neq Z$) between the contents A of the end-of-line counter (20, K) and the line counter (18, Z) which is still in the position C, as shown in FIG. 5, and simultaneously the error indicator S is not in the position "0", that is to say the multivibrator 36 has been adjusted, so that in the first place the end-of-line counter K counts down ($K := K - 1$) and the repetition counter W counts up ($W := W + 1$), as appears from the flow diagram, top centre. From FIG. 5 it appears that the end-of-line counter (20, K) switches from position A to position D, while the repetition counter (21, W) arrives from position $W=0$ into the position $W=1$ with the logic "0".

Due to the fact that there is no agreement between the line counter 18 and the end-of-line counter 20, comparator 19 does not supply an output signal via lead 55

($K \neq Z \rightarrow$ "0") so that in FIG. 3 an inverter 41 supplies an output signal and prepares the AND-gate 42. The output Q of multivibrator 36 which is connected to the AND-gate 42 also has the logic "1" ($S = Q = 1$) while on the other hand, the AND-gates 31, 38 and 40 are blocked by the signal "0" at output $\overline{Q}$ of the multivibrator 36. The AND-gate 35 is blocked by the logic signal "0" on lead 55. The third input of the AND-gate 42 also receives a logic signal "1" from the output of the AND-gate 30 so that the inverse clock signals $\overline{CL}$ on lead 51, appearing after the beginning of this signal, supplies signals at the output of the AND-gate 42 via lead 56, which count the end-of-line counter 20 down ($K := K - 1$), as indicated by the $-$sign at the relevant input, and which count the repetition counter 21 up, ($W := W + 1$) as indicated by the $+$sign at the relevant input.

This counting process is continued until there is agreement ($K = Z$) between the position of the end-of-line counter (20, K) and the line counter (18, Z). As shown by FIG. 5 the end-of-line counter (20, K) counts down, starting from A in accordance with the received end-of-line control character, via the position D to the position C, still occupied by the line counter (18, Z). Now the comparator 19 delivers an output signal ($+ =$ "1") via lead 55 so that the AND-gate 42 is now blocked by the inverter 41 and the AND-gate 35 is released instead thereof, which gate supplies an output signal at the next inverse clock signal $\overline{CL}$ on lead 51. This output signal travels to the reset input R of the bistable multivibrator 36 and switches it back to the initial position, so that now the output $\overline{Q}$ has a logic signal "1" ($S = Q = 0$), and in addition the output signal of the AND-gate 35 supplies a signal to lead 63 via the OR-gate 32, which signal starts the transfer of the contents of store 12, which now contains the information I5 of the correctly received picture line L5, to store (16, $L_r$) via the transfer circuit 15 ($L_n \rightarrow L_r$). At the end of the transfer the associated signal on lead 62 ($L_r \equiv L_n \rightarrow$ "1") starts via the OR-gate 39 and lead 60 the transfer of the contents of store (16, $L_r$) to printer (17, P) ($L_r \rightarrow P$) where this information I5 of the last correctly received picture line L5 is printed as line L3, and, in addition, line counter (18, Z) is moved to the position D. These processes are indicated on the extreme right-hand side in the flow diagram. By resetting the end-of-line counter (20, K) the repetition counter (21, W) is simultaneously moved to the position 2, as shown in FIG. 5.

As a consequence only one picture line $L3 = I5$ is printed in this manner, although it is already certain on the basis of the end-of-line control character that actually three picture lines (L3, L4, L5) should have been printed. Actually it is, however, possible that the end-of-line control character, which was transmitted last, is converted into an other control character by a disturbance so that an incorrect number of picture lines would be printed. In this case it is certain that also the next picture line would have been received in a disturbed manner, because investigations proved that disturbances extend over at least three bits and therefore not only the last two bits, indicating the two positions in the sequence of end-of-line control characters, but also at least the next code word of the next picture line must be disturbed. However, also in case there is no next disturbance of the picture line the terminating correction is performed correctly, as will be obvious from the following description.

Now the scanned picture line L6 is transmitted and correctly received with the information I6, followed by the correctly received end-of-line control character B. This control character is now taken over by a signal from the AND-gate 30 via lead 54 in the end-of-line counter (20, K). As at that time the line counter (18, Z) is still in the position D, as shown in FIG. 5, the comparator 19 with $K \neq Z$ does not supply a signal, ($-$), that is to say a logic "0". In the flow diagram of FIG. 4, where $S = 0$ this results in the interrogation of the repetition counter (21, W) and, since this counter is not in the zero position ($W \neq 0$), picture lines having the contents of store (16, $L_r$) are printed ($L_r \rightarrow P$) for the time the position of the repetition counter (21, W) reads ($W \neq 0$). This process is shown in the flow diagram of FIG. 4, bottom centre.

In the logic circuit in FIG. 3 the AND-gate 31 is blocked in this state, because the counter (21, W) is not in the zero position ($W \neq 0$) and the output $\overline{Q}$ supplies a logic "0" to lead 57, while on the other hand, the associated input of the AND-gate 40 is released via an inverter 37. The AND-gate 35 is blocked by the logic "0" signal ($K \neq Z$) on lead 55 by the comparator 19. The AND-gate 38, which was only active in the case of a disturbed picture line, is blocked by the output signal of the AND-gate 34 having the logic "0". The AND-gate 42 is blocked by the logic "0" originating from the reset multivibrator 36 ($S = 0$). The input of the AND-gate 40 which is connected to the output $\overline{Q}$ of multivibrator 36 is released, in addition the inverter 41 supplies a logic signal "1", which signal is also generated on line 61 by the store (16, $L_r$). As soon as now the AND-gate 30 supplies a logic "1" signal on the appearance of the end-of-line clock signal B on lead 69, the AND-gate 40 supplies an output signal which moves the repetition counter (21, W) via lead 59 one step back to the position 1 and starts via the OR-gate 39 and lead 60 the transmission of the contents of store (16, $L_r$), that is to say the information I5 of the previously transmitted picture line L5, to the printer (17, P) where this contents is printed as the fourth printed picture line $L4 = I5$. In addition the signal on lead 60 moves the line counter (18, Z) one step further towards position A.

After the starting signal on lead 60 ($L_r \rightarrow P$) the logic signal "1" on lead 61 which, for example, is supplied by a counter which varies congruently in the transmission of the contents of store 16, disappears and appears again after reading has ended. With this renewed logic "1" signal on lead 61 the AND-gate 40 again supplies an output signal which, via the OR-gate 39 and lead 60, starts the renewed transmission of the information I5 of the transmitted picture line L5 present in store 16 to printer (17, P), where this information I5 is printed as printed line $L5 = I5$, and which effects that the line counter (18, Z) is moved to the position B and the repetition counter (21, W) to the position ($W = 0$), with the logic "1" on the output $\overline{Q}$. The signal ($W = 0 \rightarrow$ "1") appearing as a result thereof on lead 57 blocks the AND-gate 40 via the inverter 37 and releases the associated input of the AND-gate 31 which, however, is blocked by the signal, which has changed to logic "0" in the meantime, of line 61, as well as the AND-gate 35. As soon as the release of the contents of store (16, $L_r$) has ended ($P \equiv L_r \rightarrow$ "1") the logic signal "1" appears again on lead 61 and supplies, at the output of the AND-gate 31 and, depending on the phase position of the signal on lead 61 relative to the inverse clock signal $\overline{CL}$ on lead 51, optionally, at the same time at the output of the AND-gate 35, a signal which via the OR-gate 32 excites the transfer circuit 15 for transferring the contents of store (12, $L_n$) to store (16, $L_r$). As a result the information I6 of the correctly received picture line L6 arrives in store (16, $L_r$).

At the end of the transmission a logic "1" signal appears again on lead 62, which signal effects via the OR-gate 39 and lead 60 the transfer of this picture line L6 to the printer (17, P) where this picture line is printed as the sixth printed line $L6=I6$, and the line counter (18, Z) moves on to position C. This last-mentioned transmission of the received picture line L6 to store 16 and the transfer to the printer 17 corresponds to the process in the flow diagram of FIG. 4, this transfer taking place with a positive interrogation of the repetition counter (21, W) to its zero position ($W=0$). ($K \neq Z$, $S=0$, $W=0$).

FIG. 5 shows, especially on receipt of line L7 and the simultaneous signal processing that the information I7 is entered into store (12, $L_n$) by means of the clock signal CL and that for simultaneously reading the information I6 the clock signal 4CL having the fourfold clock frequency is supplied. Writing into and reading from store (16, $L_r$) is done by means of the fourfold clock signal 4CL.

In the transmission which now takes place and the correct receipt of the scanned picture line L6 and the subsequent end-of-line control character C the same processes take place as with the receipt of the end-of-line control character A prior to the disturbance, that is to say the counter 13 has arrived in its correct position so that the comparator 14 supplies a signal on lead 52 and the position of the line counter 18 corresponds to that of the end-of-line counter 20 in which the end-of-line control character C was written, as a result of which the comparator 19 supplies a signal via lead 55. This causes the AND-gate 35 to supply an output signal which effects, via the OR-gate 32 and lead 63, the transfer on this picture line L7 to the store 16, which picture line is thereafter transferred to printer 17 and printed as printed line $L7=I7$, counter 18 being simultaneously moved to the position D in accordance with the next end-of-line control character to be received, as shown in FIG. 5.

In this manner the correct number of picture lines is printed also in the case of a complicated disturbance which extends over three successively transmitted picture lines, wherein, in addition, an end-of-line control character was lost. The correct number of picture lines is always printed also in the case of other errors or error combinations as can be seen from the circuits of FIG. 2 and the above descriptions. However, these circuits have been given by way of example only, and there are other possibilities to determine the correct number of picture lines to be printed on the basis of the sequence of the end-of-line control characters received. Correcting the disturbedly received picture lines is then effected because the picture line which has received as the last correct picture line before the disturbance was repeated once and the picture line which was first to be received correctly after the disturbance was repeated several times. Instead of correcting by repeating adjacent, correctly received entire bit lines it is also possible to take other corrective measures.

What is claimed is:

1. A method of facsimile picture reception for use with a transmitter, wherein digital signals produced during the line-by-line scanning of pictures are transmitted in coded form for redundancy-reduction, at the end of the signals associated with a scanned picture line, one of a cyclic sequence of different end-of-line control characters selected from a predetermined number being transmitted, said method comprising decoding said coded digital signals, counting the plurality of picture elements received after each end-of-line control character, comparing said elements on the receipt of the next end-of-line control character with a selected number, examining the sequence of the end-of-line control characters received, correcting in the case of an inequality of the number of picture elements the signals for a number of picture lines, and printing said corrected signals in accordance with the sequence of the different end-of-line control characters received.

2. A method as claimed in claim 1, further comprising when a number of end-of-line control characters are missing in the sequence between two correctly received end-of-line control characters deriving signals from the signals which were received correctly before or after the transmission disturbance causing the picture element inequality of a full picture line, and printing a number of lines corresponding to the missing number.

3. A method as claimed in claim 2, wherein on receipt of non-disturbed end-of-line control character after the receipt of the signals of a full picture line with picture element inequality deriving and printing a line from the signals of the full picture line which was the last one received correctly, and on receipt of the end-of-line control character after the next correct receipt of the signals of a full picture line deriving and printing the signals for printing incorrectly received picture lines from these signals of the picture line which was the last one received correctly.

4. A method as claimed in claim 3, wherein on receipt of the end-of-line control character after the first correct receipt of the signals of a full picture line after the receipt of the disturbed signals of picture lines deriving and printing only one line with the signals from the correctly received signals, and deriving any further picture lines with the signals from the preceding correctly received signals of a full picture line, and printing upon the receipt of the next end-of-line control character after the correct receipt of the signals of the next full picture line.

5. An arrangement for facsimile transmission comprising means for scanning line-by-line a picture to be transmitted and for producing digital signals therefrom, means coupled to said scanning means for coding said digital signals to thereby reduce redundancy, and means coupled to said scanning and coding means for adding to said coded signals at the end of each scan line one of a different one of a cyclic sequence of a predetermined number of end-of-line control characters.

6. An arrangement for facsimile transmission as claimed in claim 5, wherein said adding means comprises means coupled to said scanning means for providing an end of scanning line pulse, a codeword generator means coupled to said providing means for generating said different end-of-line control characters, and a cyclic counter means coupled to said providing and codeword generator means and having a capacity equal to the total number of different end-of-line control characters for controlling the codeword generator so that each counter position is fixedly associated with the generation of a given end-of-line control character.

7. An arrangement as claimed in claim 6, wherein the code word generator means includes means for forming the end-of-line control character from a number of bit-signals predetermined for all end-of-line control characters and from the signals at the output of the cyclic counter.

8. A method for facsimile transmission comprising producing digital signals by scanning line-by-line a picture to be transmitted, reducing redundancy by coding said digital signals, and adding to said coded signals at the end of each scan line one of a different one of a cyclic sequence of a predetermined number of end-of-line control characters.

9. An apparatus for facsimile reception for use with a transmitter wherein digital signals produced during a line-by-line scanning of a picture are transmitted in coded form for redundancy reduction, at the end of the signals associated with a scanned picture line one of a cyclic sequence of different end-of-line control characters selected from a predetermined number being transmitted, said apparatus comprising means for decoding said coded digital signals, means coupled to said decoding means for counting the plurality of picture elements received after each end-of-line control character, means coupled to said counting means for comparing said elements on the receipt of the next end-of-line control character with a selected number, means coupled to said decoding means for examining the sequence of the end-of-line control characters received, means coupled to said examining means for correcting in the case of an inequality of the number of picture elements the signals for a number of picture lines, and means coupled to said correcting means for printing said corrected signals in accordance with the sequence of the different end of line control characters received.

10. An apparatus as claimed in claim 9, wherein said examining means comprises a cyclic counter having a capacity equal to said cyclic sequence and having input means for receiving a switch through pulse, and a caparator means coupled to said decoder means and said cyclic counter for comparing the position of said cyclic counter to a code word derived from the received end of line control character.

* * * * *